US010875271B2

(12) United States Patent
Klimovski et al.

(10) Patent No.: US 10,875,271 B2
(45) Date of Patent: Dec. 29, 2020

(54) GAP FILLERS FOR COMPOSITE MATERIALS

(71) Applicant: The Boeing Company, Chicago, IL (US)

(72) Inventors: Andrew Klimovski, Doncaster East (AU); Karlgren Ka-Tsun Lai, Doncaster East (AU)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/857,866

(22) Filed: Apr. 24, 2020

(65) Prior Publication Data
US 2020/0247078 A1    Aug. 6, 2020

Related U.S. Application Data

(62) Division of application No. 15/266,130, filed on Sep. 15, 2016, now Pat. No. 10,668,683.

(51) Int. Cl.
| | |
|---|---|
| *B29D 99/00* | (2010.01) |
| *B32B 37/00* | (2006.01) |
| *B29C 70/08* | (2006.01) |
| *B29C 65/00* | (2006.01) |
| *B29L 31/30* | (2006.01) |
| *B29C 65/02* | (2006.01) |

(52) U.S. Cl.
CPC .......... *B29D 99/0003* (2013.01); *B29C 70/08* (2013.01); *B32B 37/0076* (2013.01); *B29C 65/02* (2013.01); *B29C 66/1122* (2013.01); *B29C 66/5326* (2013.01); *B29C 66/636* (2013.01); *B29C 66/7212* (2013.01); *B29C 66/73752* (2013.01); *B29C 66/73941* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 2006/0073311 A1* | 4/2006 | Hogg ................... | B29C 70/386 428/174 |
| 2014/0034236 A1* | 2/2014 | Guzman ................. | B29C 70/52 156/324 |
| 2014/0069586 A1* | 3/2014 | Anderson ........... | B32B 37/0046 156/499 |

* cited by examiner

*Primary Examiner* — Matthew J Daniels
*Assistant Examiner* — Mohammad M Ameen
(74) *Attorney, Agent, or Firm* — Duft & Bornsen, PC

(57) ABSTRACT

Systems and methods are provided for fabricating gap fillers for composite parts. One exemplary system includes a controller that acquires a geometry for a gap filler that will occupy a volume at a joint between laminates of curable constituent material, subdivides the geometry of the gap filler into layers, and for each layer: identifies variations in width of the layer along a length of the gap filler, and generates instructions for trimming a web of curable constituent material to match the variations in width of the layer. The system also includes rollers that dispense webs of the curable constituent material, trimmers that trim the webs of the curable constituent material based on the instructions, and compaction rollers that compact the trimmed webs together to fabricate the gap filler.

20 Claims, 8 Drawing Sheets

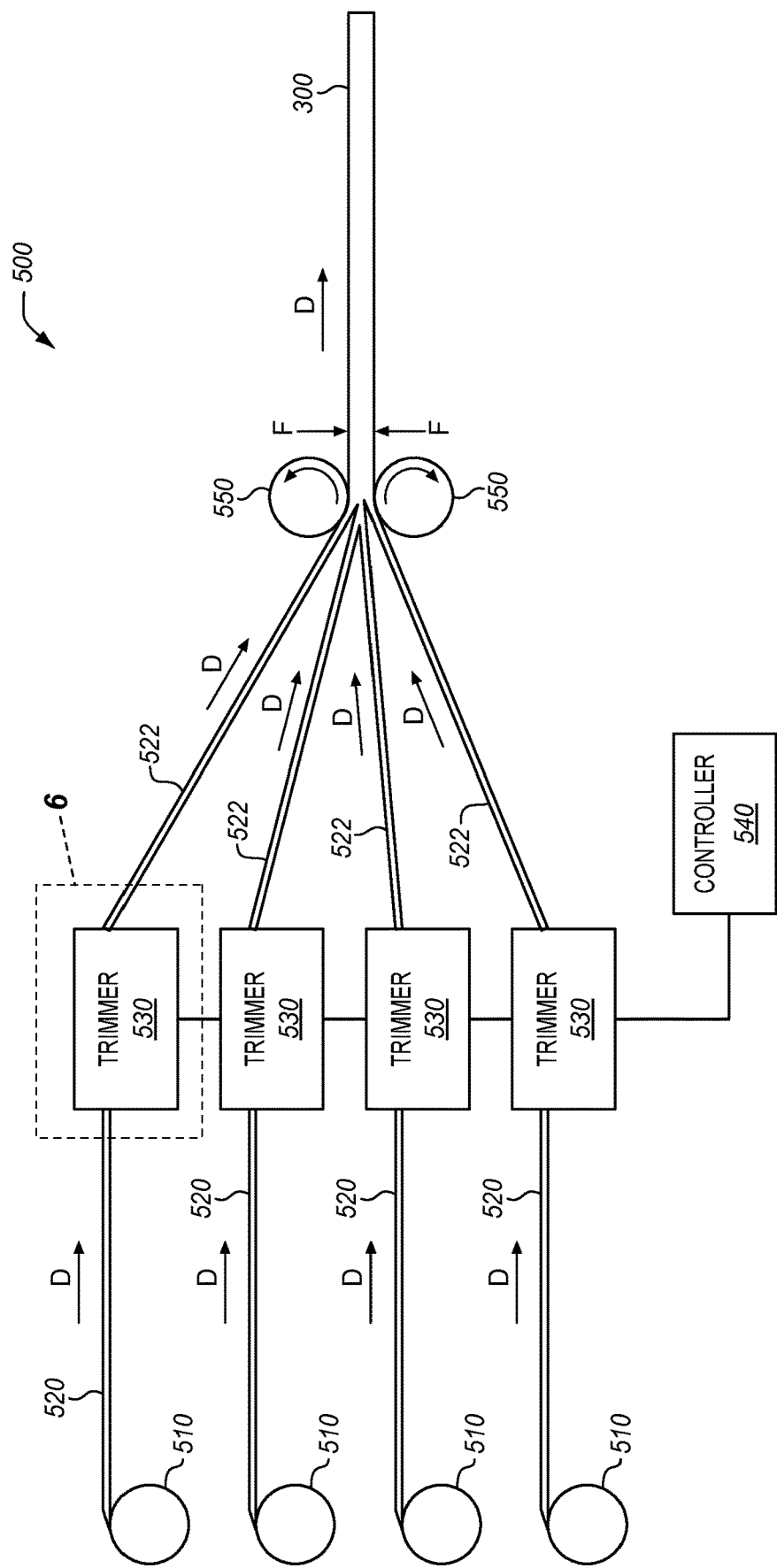

GAP FILLERS FOR COMPOSITE MATERIALS

FIELD

The disclosure relates to the field of composite materials, and in particular, to gap fillers that enhance the strength of joints in composite materials.

BACKGROUND

Multi-layer laminates of constituent material (e.g., Carbon Fiber Reinforced Polymer (CFRP)) may be formed into any of a variety of shapes before they are cured into an integral composite part. For example, dies and/or other forming tools may be utilized to alter the shape of a sheet of laminate. Some types of laminate have been impregnated with a curable resin, and are referred to as "prepreg" laminate. Other types of laminate include "dry fiber" which has not been impregnated with resin, and thermoplastic carbon fiber that includes a thermoplastic resin instead of a thermoset resin.

Popular composite parts include the stringers of an aircraft. However, such composite parts may exhibit sharp corners having tight radii. For example, a "hat" stringer used for an aircraft may have joints between laminates, and these joints may exhibit tight inner corner radii. A tight inner corner radius on a joint may cause that joint to exhibit less-than desired bond strength when the laminates are co-cured. Thus, gap fillers (colloquially referred to as "noodles") may be fabricated and inserted at the joints to maintain desired radii for those joints.

Thus, those who design composite parts continue to desire enhanced systems capable of generating gap fillers in a cost-effective manner, while also reducing the incidence and severity of gap fillers that are out-of-tolerance.

SUMMARY

Embodiments described herein provide for enhanced techniques and systems that are capable of automatically manufacturing multi-layered gap fillers, by trimming webs of constituent material and compacting those webs together. Specifically, embodiments described herein may utilize cutter blades to dynamically adjust the width of a web of constituent material along the length of the web as the web is driven across the cutter blades. Multiple webs are then compacted together in order to form a gap filler having a desired geometry. This automated process increases the precision and speed at which a gap filler may be produced.

One embodiment is a method that includes acquiring a geometry of a gap filler that will occupy a volume at a joint between laminates of curable constituent material, subdividing the geometry of the gap filler into layers, and for each layer, identifying variations in width of the layer along a length of the gap filler. The method also includes for each layer, generating instructions for trimming a web of curable constituent material to match the variations in width of the layer, trimming webs of curable constituent material based on the instructions, and compacting the trimmed webs of constituent material together to fabricate the gap filler.

A further embodiment comprises non-transitory computer readable medium embodying programmed instructions which, when executed by a processor, are operable for performing a method. The method includes acquiring a geometry of a gap filler that will occupy a volume at a joint between laminates of curable constituent material, subdividing the geometry of the gap filler into layers, and for each layer, identifying variations in width of the layer along a length of the gap filler. The method also includes for each layer, generating instructions for trimming a web of curable constituent material to match the variations in width of the layer, trimming webs of curable constituent material based on the instructions, and compacting the trimmed webs of constituent material together to fabricate the gap filler.

Another embodiment is a system. The system includes a controller that acquires a geometry for a gap filler that will occupy a volume at a joint between laminates of curable constituent material, subdivides the geometry of the gap filler into layers, and for each layer: identifies variations in width of the layer along a length of the gap filler, and generates instructions for trimming a web of curable constituent material to match the variations in width of the layer. The system also includes rollers that dispense webs of the curable constituent material, trimmers that trim the webs of the curable constituent material based on the instructions, and compaction rollers that compact the trimmed webs together to fabricate the gap filler.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 5 is a side view of a fabrication system for creating gap fillers in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
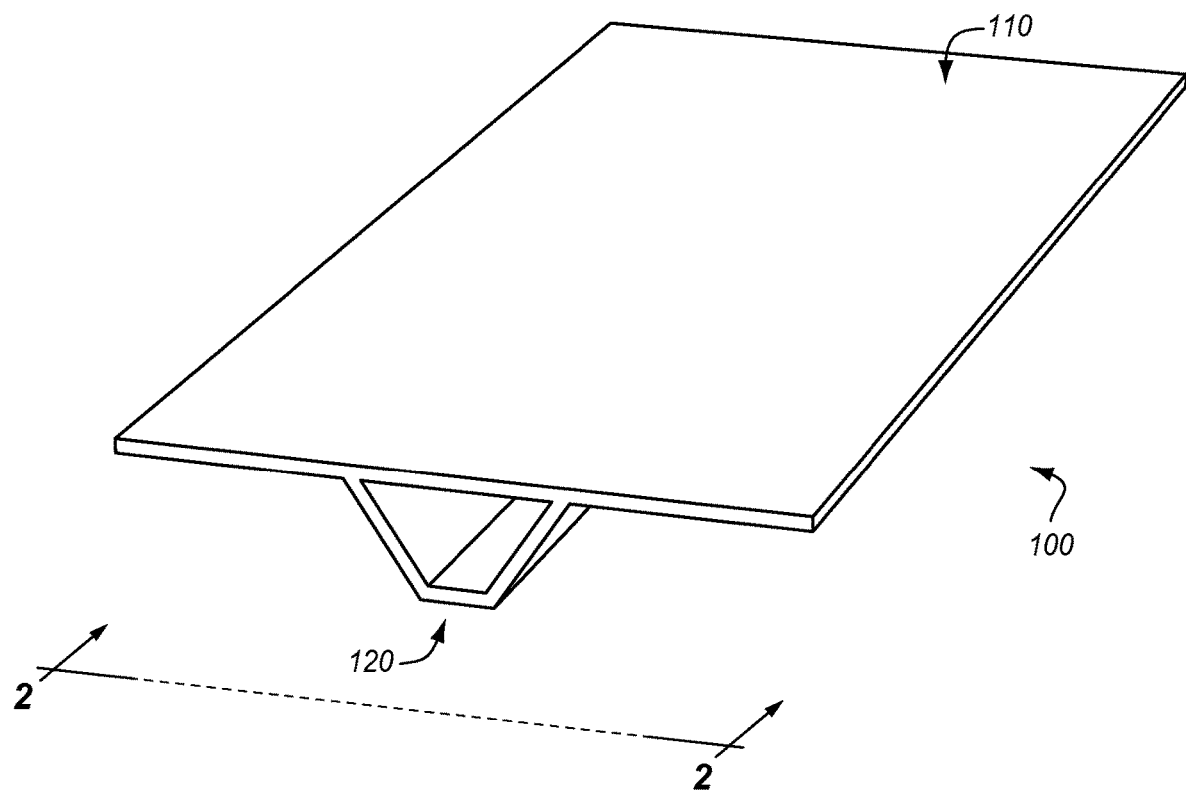
FIG. 1 is a perspective view of a composite part in an exemplary embodiment.

FIG. 1 is a perspective view of a composite part 100 in an exemplary embodiment. In this embodiment, composite part 100 comprises a "hat" stringer for an aircraft having a multi-layer laminate base 110, and a multi-layer laminate "hat" 120. In this embodiment, each laminate comprises multiple layers of constituent material, such as carbon fiber in "dry fiber" form (i.e., lacking in thermoset resin) that may be stabilized by a thermoplastic veil, or Carbon Fiber Reinforced Polymer (CFRP) comprising carbon fibers that have been pre-impregnated with a thermoset resin. After being laid-up and conformed to a desired shape, base 110 and hat 120 are co-cured (e.g., via the application of heat in a vacuum) in order to form an integral composite part (e.g., a cured carbon fiber stringer exhibiting desired strength).

Figure 2:
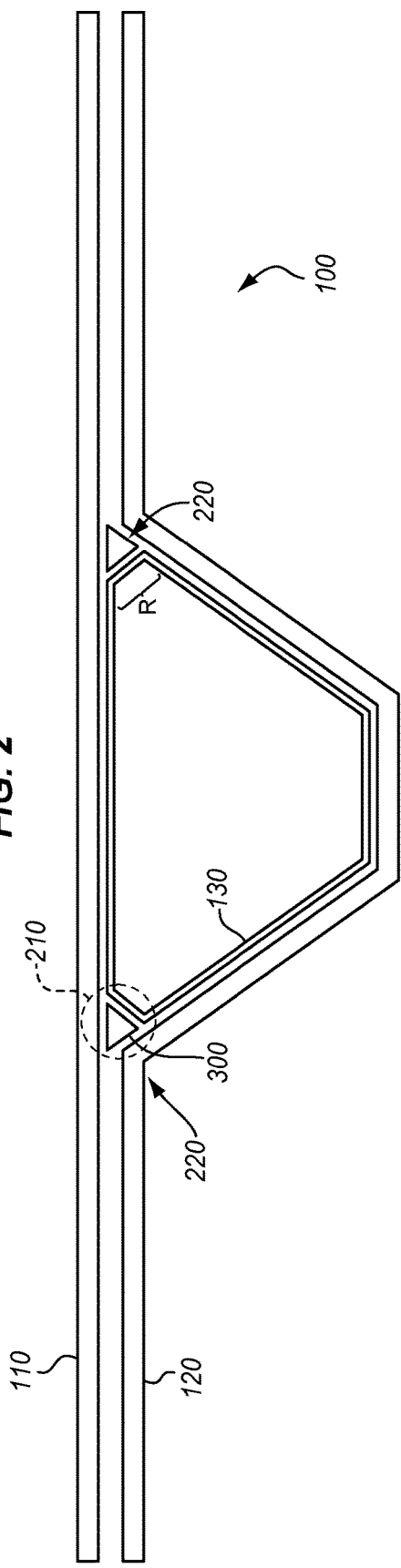
FIG. 2 is a front view of a composite part in an exemplary embodiment.

Delving deeper into the geometry of composite part 100, FIG. 2 provides a front view of composite part 100, as indicated by view arrows 2 of FIG. 1. As shown in FIG. 2, hat 120 and base 110 unite at joint 220. Without a gap filler, joint 220 would exhibit a tight radius of curvature, which would increase the susceptibility of joint 220 to dis-bond and effectively limits the strength of joint 220. To address this issue, part 100 includes gap filler 300 placed within volume 210 at joint 220. Gap filler 300 may also be referred to as a "noodle" or "spacer." Gap filler 300 maintains a desired radius (R) of joint 220, thereby increasing the strength of joint 220 and preventing dis-bond between base 110 and hat 120. A laminate wrap 130 is also illustrated to further secure gap filler 300 within composite part 100. The various components shown for composite part 100 may be co-cured together in order to unify them into a single, integral composite part 100.

Figure 3:
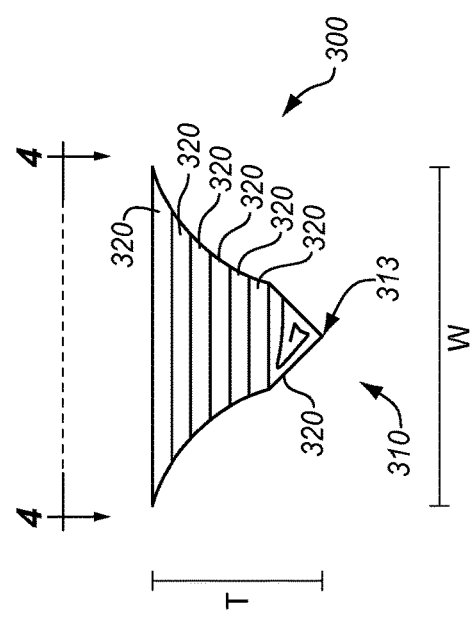
FIG. 3 is a front view of a gap filler in an exemplary embodiment.

FIG. 3 is a zoomed in front view of gap filler 300. As shown in FIG. 3, gap filler 300 exhibits a width W and a thickness T. These properties may vary along the length of gap filler 300, and the width may even vary on a layer-by-layer basis within gap filler 300. As used herein, a "layer" of gap filler 300 comprises a set of one or more plies of curable constituent material having the same width. In this embodiment, gap filler 300 includes six layers 320, as well as a tip 310. Tip 310 may comprise, for example, a "rolled up" layer 320 that has been pultruded in order to exhibit a sharp point 313. This enhances the ability of gap filler 300 to tightly fill in volume 210 without forming air gaps or other undesirable structural features.

Figure 4:
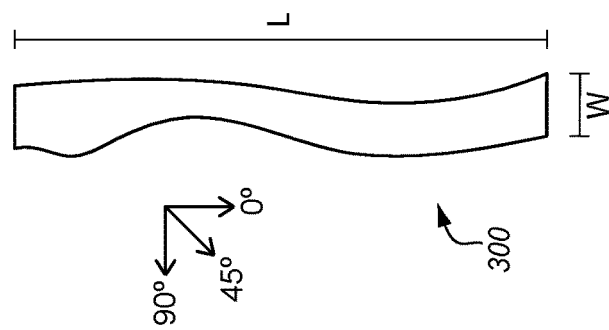
FIG. 4 is a top view of a gap filler having a variable width in an exemplary embodiment.

FIG. 4 is a top view of gap filler 300. FIG. 4 illustrates that gap filler 300 varies in width along its length (L). FIG. 4 further illustrates a variety of directions in which fibers (e.g., carbon fiber) may be oriented within one or more of the layers 320 of gap filler 300. For example, fibers running along the length of gap filler 300 have a fiber orientation of 0°, and fibers running perpendicular to the length of gap filler have a fiber orientation of 90°. By varying fiber orientations between layers and/or plies, gap filler 300 may exhibit greater strengths in regards to forces applied in different directions. While gap filler 300 is shown as being roughly ten times as long as its width in FIG. 4, it should be understood that gap filler 300 may be particularly long (e.g., on the order of tens of meters) and particularly narrow (e.g., varying in width but averaging a few centimeters).

With the properties of gap filler 300 readily described above, FIGS. 5-10 focus upon systems for automatically fabricating gap fillers. FIG. 5 is a side view of a fabrication system 500 for creating gap fillers 300 in an exemplary embodiment. Fabrication system 500 comprises any system, device, or component capable of automatically fabricating gap fillers having variable widths that are defined on a layer-by-layer basis. As shown in FIG. 4, fabrication system 500 includes multiple rollers 510, which direct webs 520 of curable constituent material (e.g., dry fiber) in a web direction D. Rollers 510 may include motorized components capable of driving webs 520 towards their destinations. Each web 520 corresponds with a layer 320 of gap filler 300 (e.g., a set of one or more plies having the same width). Trimmers 530 trim each web 520 as webs 520 continue in web direction D. Specifically, trimmers 530 dynamically trim webs 520 to adjust the widths of webs 520, in accordance with input from controller 540. Controller 540 may be implemented, for example, as custom circuitry, as a processor executing programmed instructions, or some combination thereof.

Trimmed webs 522 proceed onwards to compaction rollers 550, which compact and optionally heat trimmed webs 522 in order to form a multi-layer laminate ready for curing (e.g., gap filler 300). In a further embodiment, a unidirectional fiber tip 310 (e.g., a pultruded tip, stamped tip, hand laid-up tip) is separately added to gap filler 300, in order to increase the ability of gap filler 300 to conform to a desired volume.

Figure 6:
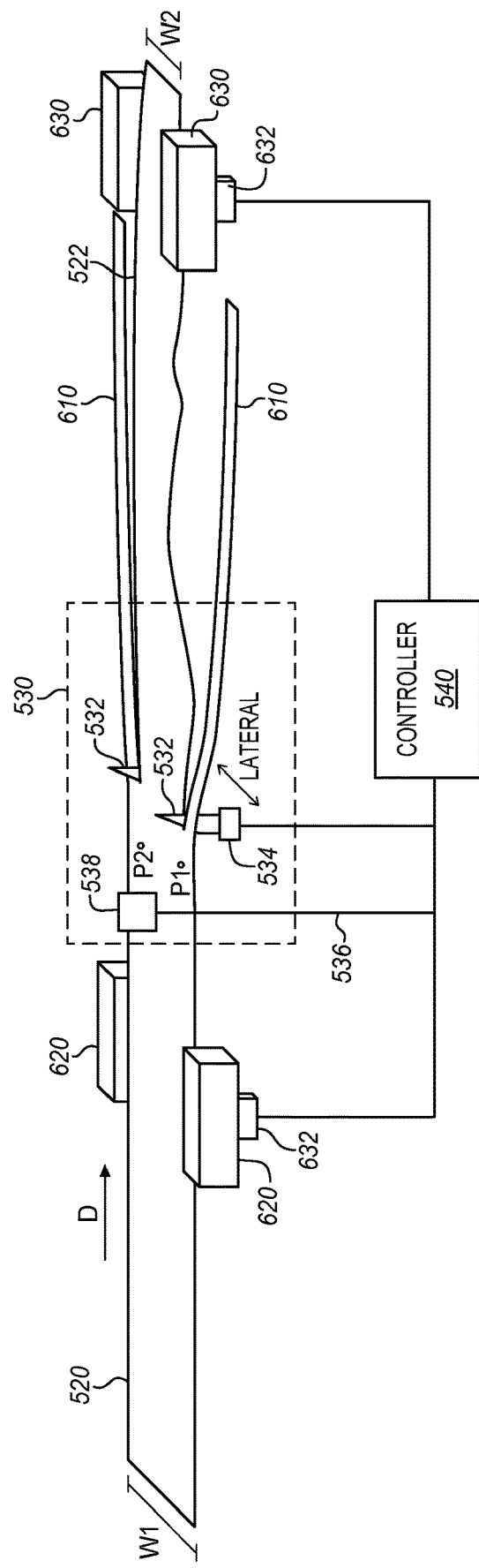
FIG. 6 is a perspective view illustrating the operation of a trimmer of a fabrication system in an exemplary embodiment.

FIG. 6 further illustrates the operations of a trimmer 530. As shown in FIG. 6, mobile guides 620 and 630 may be utilized to enforce a lateral position (i.e., a position along the lateral axis shown in FIG. 6, corresponding with the axis defining the width of web 520) for web 520, as well as for trimmed web 522. The positions of guides 620 and/or 630 may be automatically adjusted by controller 540 via actuators 632 in order to ensure that trimmed webs 522 will align properly when stacked together and compacted by compaction rollers 550 of FIG. 5. Sensor 538 may be utilized in order to track how far web 520 has traveled in direction D. Meanwhile communication pathway 536 (e.g., a Universal Serial Bus (USB) cord, Ethernet cord, or other component) provides input to controller 540 from sensor 538, and instructions from controller 540 to actuators 534.

Trimmer 530 includes cutter blades 532, which cut web 520 as web 520 is driven across cutter blades 532. Each cutter blade 532 occupies a lateral position (e.g., P1, P2), and the lateral position of each cutter blade 532 may be adjusted by controller 540 providing input to actuators 534 (e.g., one actuator 534 for each cutter blade 532). The act of cutting/trimming the width of web 520 (having an initial width W1) to form a trimmed web 522 (having a final width W2) results in scrap 610, which may be discarded as desired.

Figure 7:
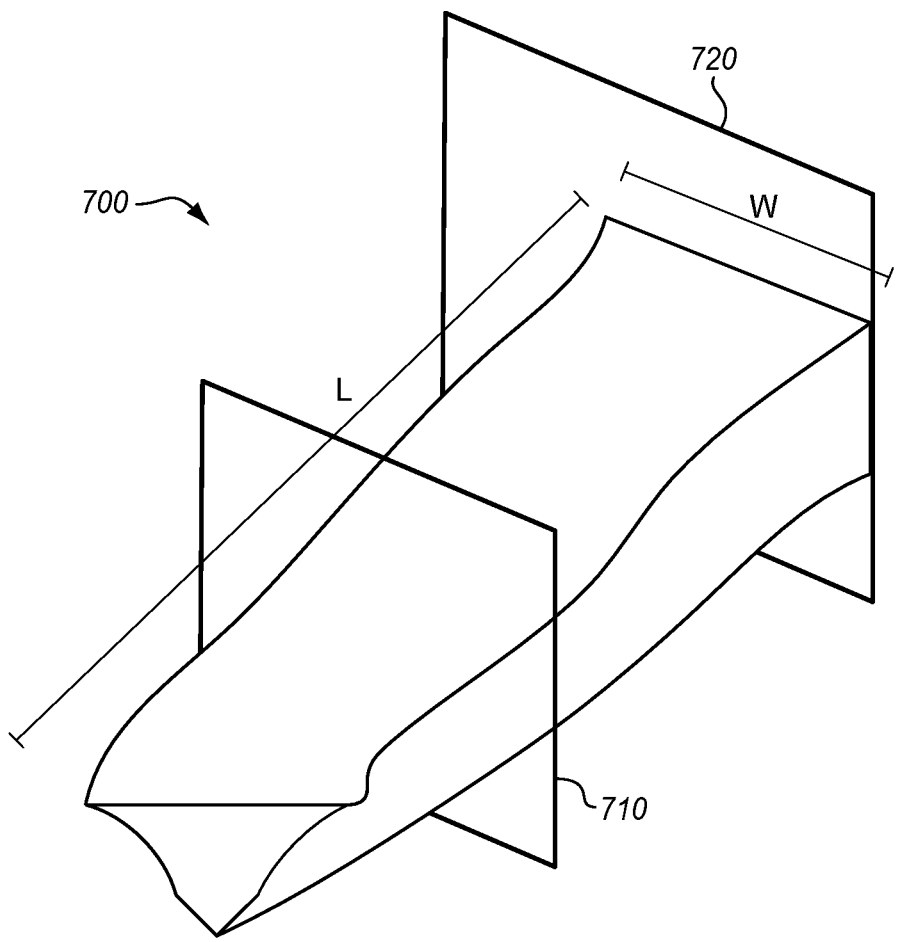
FIG. 7 is a perspective view of a gap filler in an exemplary embodiment.
Figure 8:
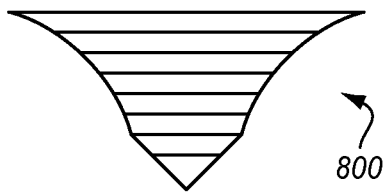
FIGS. 8-9 are cross-sections of the gap filler of FIG. 7 in an exemplary embodiment.
Figure 9:
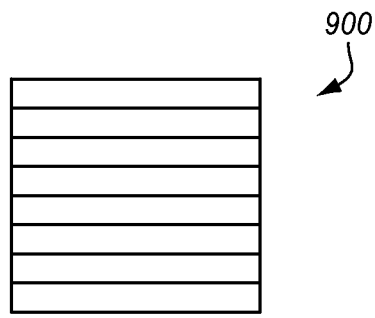

FIGS. 7-9 illustrate an exemplary gap filler 700 which may be fabricated by fabrication system 500 of FIG. 5. Specifically, FIG. 7 is a perspective view of a gap filler 700 in an exemplary embodiment, and FIGS. 8-9 are cross-sections of gap filler 700 of FIG. 7. As shown in FIG. 7, along the length L of gap filler 700, width (W) varies, on a layer-by-layer basis. Hence, cross section 800 of FIG. 8 (corresponding to slice 710 of FIG. 7), exhibits a triangular cross-section, while cross section 900 of FIG. 9 (corresponding to slice 720 of FIG. 7) exhibits a square cross section.

Gap filler 700 illustrates just one of many varying geometries that may be generated by fabrication system 500 of FIG. 5.

Illustrative details of the operation of fabrication system 500 will be discussed with regard to FIG. 10. Assume, for this embodiment, that a user wishes to craft a gap filler 300 having a known/predetermined geometry that provides an increased radius of curvature to a joint where multiple laminates of a hat stringer will be cured together. The user therefore loads data indicating the desired geometry of the gap filler 300.

Figure 10:
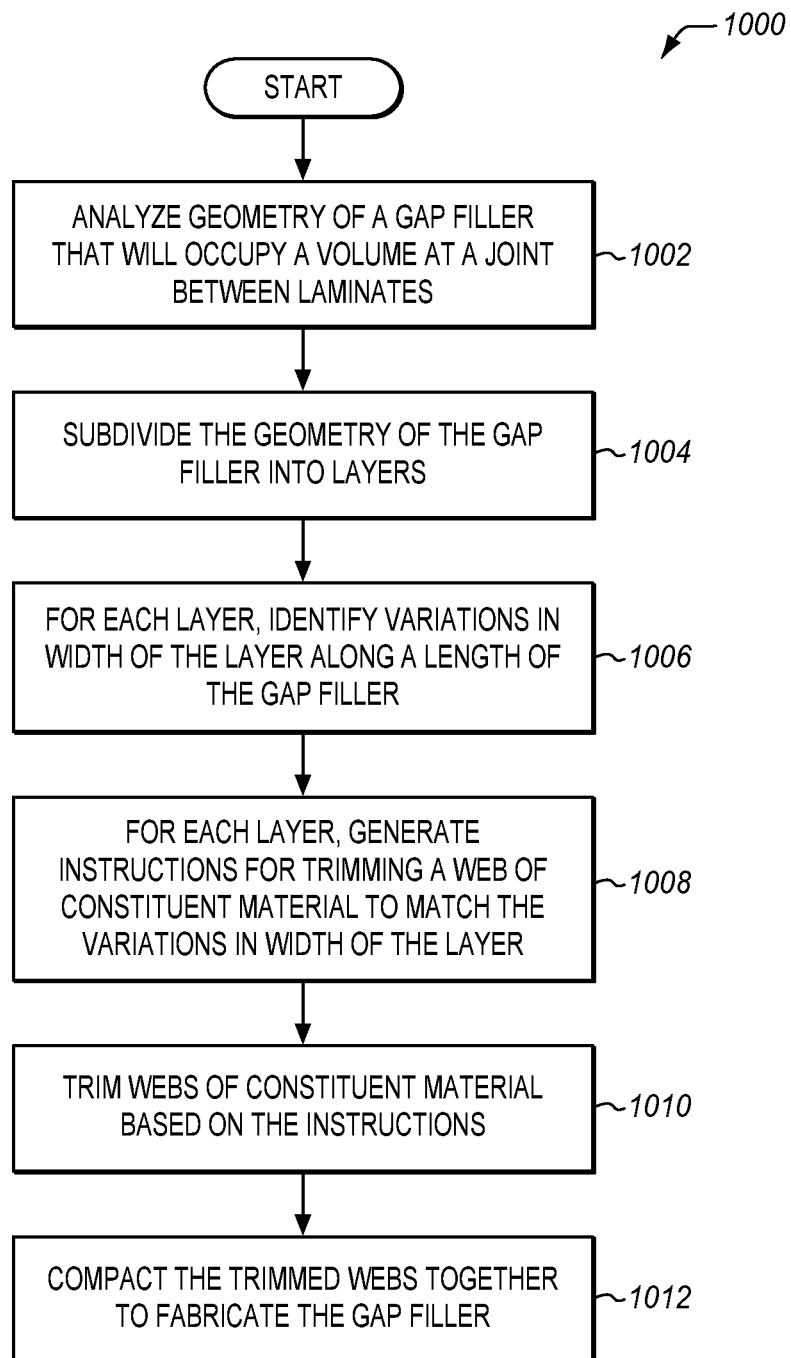
FIG. 10 is a flowchart illustrating a method for fabricating a gap filler in an exemplary embodiment.

FIG. 10 is a flowchart illustrating a method 1000 for fabricating a gap filler in an exemplary embodiment. The steps of method 1000 are described with reference to fabrication system 500 of FIG. 5, but those skilled in the art will appreciate that method 1000 may be performed in other systems. The steps of the flowcharts described herein are not all inclusive and may include other steps not shown. The steps described herein may also be performed in an alternative order.

In order to determine the desired three dimensional (3D) shape for gap filler 300, controller 540 analyzes the geometry of gap filler 300 indicated by the data, and quantifies the width, length, and thickness of gap filler 300 at varying locations (step 1002). Gap filler 300 will occupy volume 210 at joint 220 between laminates 110 and 120, as shown in FIG. 2. Controller 540 next proceeds to subdivide the geometry of gap filler 300 into layers 320 (step 1004). Subdividing the geometry of gap filler 300 into layers 320 may comprise subdividing the thickness of gap 300 into layers of similar thickness (e.g., layers that each have the same number of plies), or layers that each have a different amount of thickness (e.g., layers that each have a different number of plies). Controller 540 further identifies variations in the width of each layer 320 along the length of gap filler 300 (step 1006). These parameters indicate how individual webs 520 will be cut by trimmers 530.

In this embodiment, each layer 320 occupies a portion of the thickness of gap filler 300, and comprises one or more plies of constituent material. Furthermore, the number of plies/thickness defined for a layer 320 corresponds with a number of plies/thickness of a web 520 from which that layer 320 will be cut. Depending on the number of layers 320, a larger or smaller number of webs 520 may be utilized in order to construct gap filler 300.

For each layer 320, controller 540 generates instructions for trimming a web 520 of curable constituent material in a manner that matches the variations in width of that layer 320 (step 1008). For example, if one layer 320 starts at a width X, narrows down to a width of X/2, and increases in width back to X, controller 540 may generate instructions to reposition cutters 532 of a trimmer 530 over time, in order to cut a web 520 into a desired trimmed web 522 matching these variations in width. Controller 540 may time these instructions based on a known speed at which web 520 is driven, based on input from sensor 538 indicating a distance which web 520 has been driven, etc.

With the instructions prepared, controller 540 directs fabrication system 500 to drive webs 520 through trimmers 530, thereby trimming webs 520. The trimming is performed based on the instructions generated by controller 540 (step 1010). Thus, controller 540 may direct the operations of guides 620 and 630, as well as actuators 534 in order to ensure that webs 520 are trimmed properly and aligned with each other as they enter compaction rollers 550. In this embodiment, guides 630 may be dynamically varied by actuators 632 as trimming continues in order to conform to trimmed web 522. Compaction rollers 550 tack/press together trimmed webs 522, ensuring the creation of an as-yet uncured gap filler 300 (step 1012). In order to ensure that trimmed webs 522 align along their length, controller 540 may drive webs 520 synchronously such that webs 520 (and therefore trimmed webs 522) proceed at the same speed towards compaction rollers 550.

The newly created gap filler 300 may further be laid-up at joint 220, and co-cured with other laminates in order to form a single unified complex part. These operations may further be repeated in order to generate multiple gap fillers 300 for multiple composite parts.

Utilizing method 1000, gap fillers 300 may be repeatedly and predictably fabricated in a manner that eliminates human error. This enhances the speed and accuracy with which gap fillers are fabricated, reducing the cost of assembly and manufacturing of complex composite parts.

Examples

In the following examples, additional processes, systems, and methods are described in the context of a fabrication system that creates gap fillers for composite parts.

Figure 11:
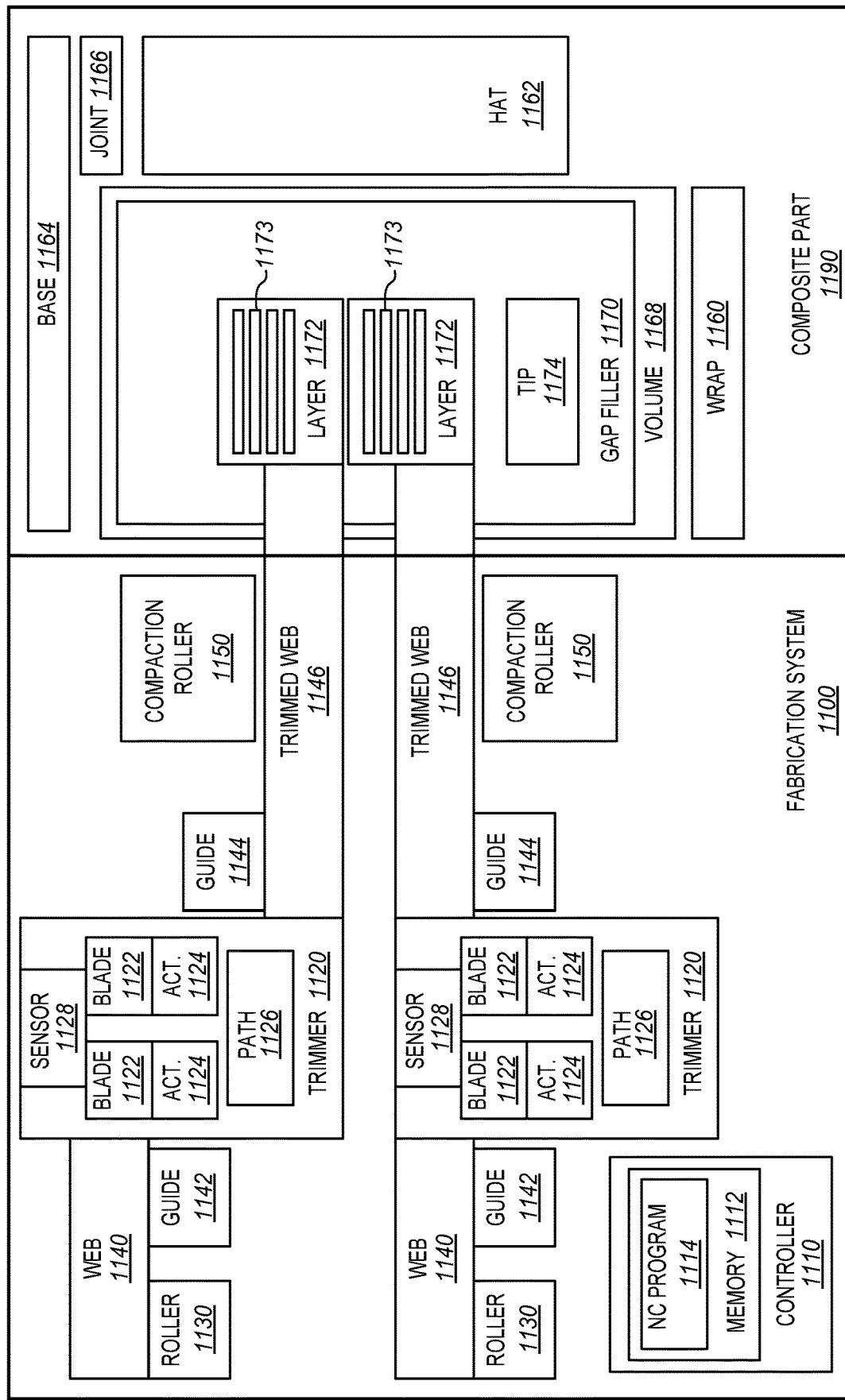
FIG. 11 is a block diagram of a fabrication system for a gap filler in an exemplary embodiment.

FIG. 11 is a block diagram of a fabrication system 1100 in an exemplary embodiment. As shown in FIG. 11, fabrication system 1100 includes a controller 1110 with a memory 1112 storing a Numerical Control (NC) program 1114 which directs the operations of multiple trimmers 1120 and guides (1142, 1144). Fabrication system 100 further includes webs 1140, which are directed by rollers 1130, which in this embodiment are motorized. Webs 1140 are trimmed by trimmers 1120, resulting in trimmed webs 1148 which are compacted by compaction rollers 1150. In this embodiment, compaction rollers 1150 are heated to facilitate trimmed webs 1146 integrating into a gap filler 1170. Furthermore, in this embodiment sensors 1128 monitor the progress of webs 1140 and provide input to controller 1110 via communication pathways (e.g., path 1126). Based on this progress information indicating how far webs 1140 have traveled, controller 1110 provides instructions via communication pathways 1126 in order to reposition actuators 1124, thereby moving cutter blades 1122 laterally with respect to webs 1140.

The right side of FIG. 11 illustrates a completed gap filler 1170 placed within a composite part 1190. As shown in FIG. 11, composite part 1190 includes base 1164 and hat 1162, which are laid-up in order to form joint 1166. Gap filler 1170 is placed within volume 1168 at joint 1166, and is covered by wrap 1160. In this embodiment, gap filler 1170 includes layers 1172, which each correspond to a trimmed web 1146, and each may vary in width in a different manner along their length. Each layer 1172 includes multiple plies 1173, and the plies for each layer may exhibit the same or different fiber orientations.

Figure 12:
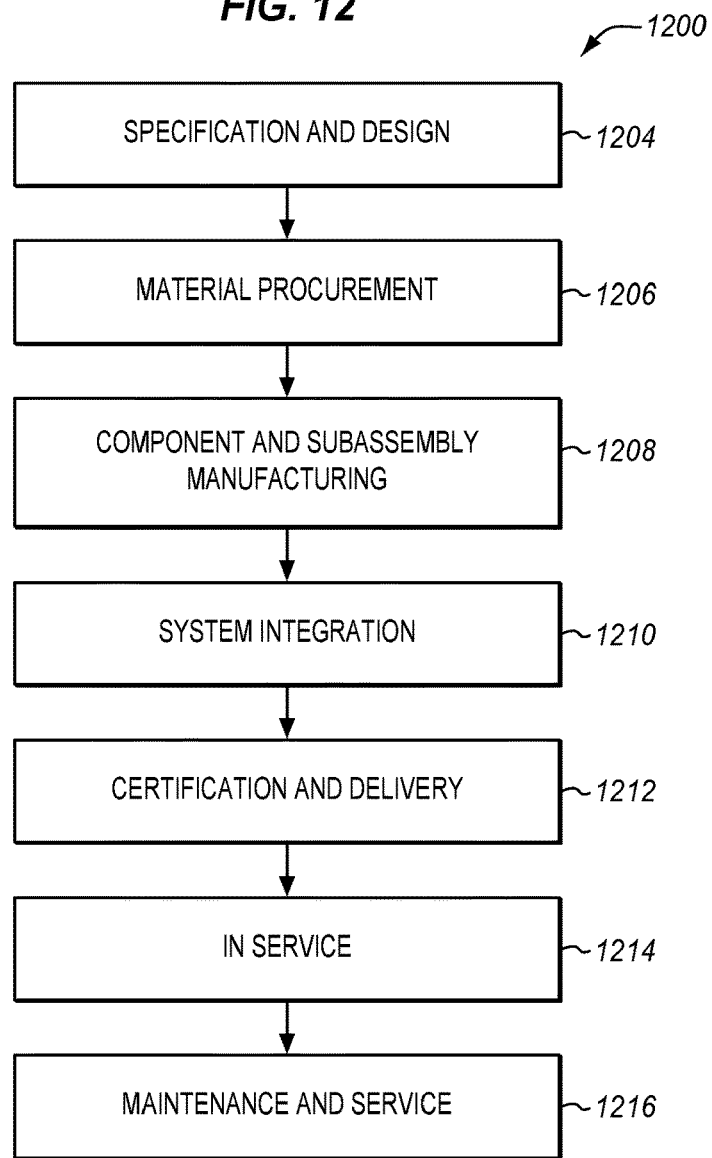
FIG. 12 is a flow diagram of aircraft production and service methodology in an exemplary embodiment.
Figure 13:
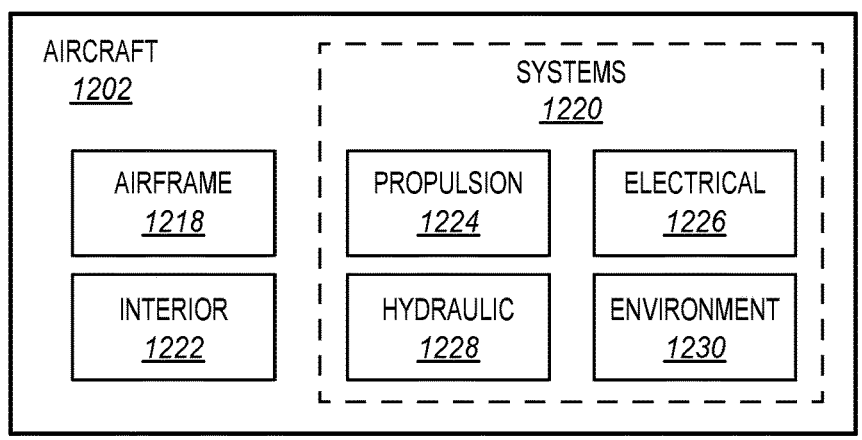
FIG. 13 is a block diagram of an aircraft in an exemplary embodiment.

Referring more particularly to the drawings, embodiments of the disclosure may be described in the context of an aircraft manufacturing and service method 1200 as shown in FIG. 12 and an aircraft 1202 as shown in FIG. 13. During pre-production, exemplary method 1200 may include specification and design 1204 of the aircraft 1202 and material procurement 1206. During production, component and sub-assembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 1216 (which may also include modification, reconfiguration, refurbishment, and so on). Apparatus and methods embodied herein may be employed during any one or more suitable stages of the production and service method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion 1224, electrical 1226, hydraulic 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1200. For example, components or subassemblies corresponding to production stage 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216. For example, the techniques and systems described herein may be used for steps 1206, 1208, 1210, 1214, and/or 1216, and/or may be used for airframe 1218 and/or interior 1222. These techniques and systems may even be utilized for systems 1220, including for example propulsion 1224, electrical 1226, hydraulic 1228, and/or environmental 1230.

In one embodiment, gap filler 300 comprises a portion of a stringer of airframe 1218, and is manufactured during component and subassembly manufacturing 1208. Gap filler 300 may then be assembled into the stringer, which itself is assembled into airframe 1218 an aircraft in system integration 1210, and then be utilized in service 1214 until wear renders the stringer unusable. Then, in maintenance and service 1116, the stringer may be discarded and replaced with a newly manufactured stringer utilizing newly manufactured gap fillers.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A system comprising:
a controller that acquires a geometry for a gap filler that will occupy a volume at a joint between laminates of curable constituent material, subdivides the geometry of the gap filler into layers, and for each layer: identifies variations in width of the layer along a length of the gap filler, and generates instructions for trimming a web of curable constituent material to match the variations in width of the layer;
rollers that dispense webs of the curable constituent material;
trimmers that trim the webs of the curable constituent material based on the instructions, by dynamically varying positions of trimmers to match variations in width for corresponding layers as the webs proceed in a web direction, wherein each web is independently trimmed to form a trimmed web that occupies a single layer of the gap filler; and
compaction rollers that compact the trimmed webs together to fabricate the gap filler for application to the volume.

2. The system of claim 1 wherein:
the constituent material comprises dry fiber.

3. The system of claim 1 wherein:
the constituent material comprises resin impregnated Carbon Fiber Reinforced Polymer (CFRP).

4. The system of claim 1 further comprising:
guides that hold a web in a lateral position prior to reaching a trimmer.

5. The system of claim 1 further comprising:
dynamically repositioning, via actuators, guides that hold a trimmed web in a lateral position after the web is trimmed.

6. The system of claim 1 wherein:
the trimmers each comprise a cutter blade that trims off a portion of a width of a web as the web is driven across the cutter blade, and an actuator that changes a lateral position of the cutter blade.

7. The system of claim 1 wherein:
each of the rollers dispenses a web to a different trimmer.

8. The system of claim 1 wherein:
the controller drives the webs synchronously.

9. The system of claim 1 wherein:
the compaction rollers tack the webs together.

10. The system of claim 1 wherein:
the instructions include instructions for repositioning cutter blades at the trimmers.

11. An apparatus comprising:
rollers that dispense webs of a curable constituent material for layers of a gap filler;
trimmers that trim the webs of the curable constituent material based on instructions for trimming to match variations in width of each of the layers as the webs proceed in a web direction, wherein each web is independently trimmed to form a trimmed web that occupies a single layer of the gap filler; and
compaction rollers that compact the trimmed webs together to fabricate the gap filler for application to the volume.

12. The apparatus of claim 11 wherein:
the constituent material comprises dry fiber.

13. The apparatus of claim 11 wherein:
the constituent material comprises resin impregnated Carbon Fiber Reinforced Polymer (CFRP).

14. The apparatus of claim 11 further comprising:
guides that hold a web in a lateral position prior to reaching a trimmer.

15. The apparatus of claim 11 further comprising:
dynamically repositioning, via actuators, guides that hold a trimmed web in a lateral position after the web is trimmed.

16. The apparatus of claim 11 wherein:
the trimmers each comprise a cutter blade that trims off a portion of a width of a web as the web is driven across the cutter blade, and an actuator that changes a lateral position of the cutter blade.

17. The apparatus of claim 11 wherein:
each of the rollers dispenses a web to a different trimmer.

18. The apparatus of claim 11 wherein:
the webs are driven synchronously.

19. The apparatus of claim 11 wherein:
the compaction rollers tack the webs together.

20. A non-transitory computer readable medium embodying programmed instructions which, when executed by a processor, are operable for performing a method comprising:
analyzing a geometry for a gap filler that will occupy a volume at a joint between laminates of curable constituent material;
subdividing the geometry of the gap filler into layers;
for each layer, identifying variations in width of the layer along a length of the gap filler;
for each layer, generating instructions for trimming a web of curable constituent material to match the variations in width of the layer;
trimming webs of curable constituent material based on the instructions, by dynamically varying positions of trimmers to match variations in width for corresponding layers as the webs proceed in a web direction, wherein each web is independently trimmed to form a trimmed web that occupies a single layer of the gap filler;
compacting the trimmed webs of constituent material together to fabricate the gap filler; and
applying the gap filler to the volume.

* * * * *